(12) United States Patent
Ho et al.

(10) Patent No.: US 11,630,259 B1
(45) Date of Patent: Apr. 18, 2023

(54) LIGHT-EMITTING DEVICE

(71) Applicant: Chicony Power Technology Co., Ltd., New Taipei (TW)

(72) Inventors: Hsuan-Wei Ho, New Taipei (TW); Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/929,315

(22) Filed: Sep. 2, 2022

(30) Foreign Application Priority Data

Jun. 27, 2022 (TW) .................................. 111123950

(51) Int. Cl.
*F21V 8/00* (2006.01)

(52) U.S. Cl.
CPC ......... *G02B 6/0053* (2013.01); *G02B 6/0031* (2013.01)

(58) Field of Classification Search
CPC ...... G02B 6/005; G02B 6/0008; G02B 6/001; G02B 6/0086; G02B 6/0011; G02B 6/0035; G02B 6/0036; G02B 6/004; G02B 6/0043
See application file for complete search history.

(56) References Cited

U.S. PATENT DOCUMENTS

| | | | |
|---|---|---|---|
| 10,083,638 | B2 | 9/2018 | Lin |
| 10,690,837 | B2 * | 6/2020 | Liu ..................... G02F 1/13318 |
| 2022/0099882 | A1 * | 3/2022 | Wen ..................... G02B 6/0061 |

FOREIGN PATENT DOCUMENTS

| | | |
|---|---|---|
| CN | 102434812 A | 5/2012 |
| CN | 104235637 A | 12/2014 |
| CN | 211199817 U | 8/2020 |
| CN | 211649924 U | 10/2020 |
| CN | 113847583 A | 12/2021 |
| TW | 201321670 A | 6/2013 |
| TW | I641779 B | 11/2018 |

* cited by examiner

*Primary Examiner* — Matthew J. Peerce
(74) *Attorney, Agent, or Firm* — CKC & Partners Co., LLC

(57) ABSTRACT

A light-emitting device includes a main body, a light guide plate, and a flexible circuit board. The main body includes a light exit wall and a side wall connected and bent relative to each other. The light exit wall and the side wall together form a groove. The light guide plate has a light exit region and a light mixing region. Microstructures are disposed on the light exit region. At least a part of the light exit region is engaged in the groove. The flexible circuit board has a light-emitting unit. The light-emitting unit is configured to emit light toward a side surface of the light mixing region. The light enters the light guide plate from the side surface of the light mixing region and is totally reflected in the light mixing region, and then is guided to the light exit wall through the microstructures.

14 Claims, 4 Drawing Sheets

LIGHT-EMITTING DEVICE

CROSS-REFERENCE TO RELATED APPLICATION

This application claims priority to Taiwan Application Serial Number 111123950, filed Jun. 27, 2022, which is herein incorporated by reference.

BACKGROUND

Technical Field

The present disclosure relates to a light-emitting device.

Description of Related Art

Nowadays, some electronic devices (e.g., high-performance/gaming laptops) have additional light bars (Lens) around them to enhance the overall appearance and visual effect. At present, there are mainly two ways to make a light bar emit light: (1) a light-emitting diode (LED) is placed behind the light bar, and the light of the LED is outputted through a distal end of the light bar; and (2) an optical fiber capable of emitting light is placed behind the light bar, and the light from the optical fiber is outputted through the distal end of the light bar.

However, regardless of whether the LED or the optical fiber is used as the light source, the light bar formed by molding must be designed in front of it, so that a bending/circling shape can be made according to the appearance requirements. In addition, there is a basic thickness limit for the molding of the light bar (e.g., it must be greater than 1 mm).

Accordingly, how to provide a light-emitting device to solve the aforementioned problems becomes an important issue to be solved by those in the industry.

SUMMARY

An aspect of the disclosure is to provide a light-emitting device that can efficiently solve the aforementioned problems.

According to an embodiment of the disclosure, a light-emitting device includes a main body, a light guide plate, and a flexible circuit board. The main body includes a light exit wall and a side wall which are connected and bent relative to each other. The light exit wall and the side wall together form a groove. The light guide plate has a light exit region and a light mixing region. A plurality of microstructures are disposed on the light exit region. At least a part of the light exit region is engaged in the groove. The flexible circuit board has a light-emitting unit. The light-emitting unit is configured to emit a light toward a side surface of the light mixing region. The light enters the light guide plate from the side surface of the light mixing region and is totally reflected in the light mixing region, and then is guided to the light exit wall through the microstructures.

In an embodiment of the disclosure, the light-emitting device further includes a light mixing film. The light mixing film covers at least a part of the light guide plate.

In an embodiment of the disclosure, the light mixing film is partially adhered to the flexible circuit board and wraps the light guide plate in a surrounding manner.

In an embodiment of the disclosure, the light-emitting device further includes a reflective layer. The reflective layer is disposed on a surface of the flexible circuit board facing the light guide plate.

In an embodiment of the disclosure, the light exit wall has a ring shape.

In an embodiment of the disclosure, the side wall is connected to an edge of the light exit wall and extends to an inner side of the light exit wall.

In an embodiment of the disclosure, a bottom of the groove is at least partially transparent. Part of the light leaves the light guide plate from a side surface of the light guide plate and leaves the main body through the bottom of the groove.

In an embodiment of the disclosure, the light-emitting device further includes a light mixing film. The light mixing film is disposed between the light exit region and the light exit wall, extends into the groove, and covers a side surface of the light guide plate.

In an embodiment of the disclosure, the light-emitting device further includes a reflective layer. The reflective layer is located under the light guide plate. A light-shielding film is disposed on a bottom surface of the reflective layer.

In an embodiment of the disclosure, the light guide plate is curved and has a uniform thickness.

In an embodiment of the disclosure, the light guide plate includes a first plate portion, at least one second plate portion, and at least one bent portion. The at least one second plate portion is opposite to the first plate portion. The bent portion is connected to edges of the first plate portion and the at least one second plate portion at an identical side thereof. At least parts of the microstructures are located on the at least one bent portion.

In an embodiment of the disclosure, a number of the at least one second plate portion and a number of the at least one bent portion are two. The first plate portion is connected between the second plate portions respectively via the bent portions. Each of the second plate portions has an extending portion at an end thereof. The extending portions of the second plate portions are stacked on each other.

In an embodiment of the disclosure, the microstructures are arranged from sparse to dense along a direction, so that a brightness of the light passing through the light exit wall increases along the direction.

In an embodiment of the disclosure, an end of the side wall is connected to an edge of the light exit wall. Another end of the side wall is bent and extends to be opposite to the light exit wall.

According to an embodiment of the disclosure, a light-emitting device includes a main body, a light guide plate, and a flexible circuit board. The main body includes a light exit wall and a side wall which are connected and bent relative to each other. The light exit wall and the side wall together form a groove. The light guide plate has a light exit region which is curved. A plurality of microstructures are disposed on the light exit region. At least a part of the light exit region is engaged in the groove. The flexible circuit board has a light-emitting unit. The light-emitting unit is configured to emit a light toward a side surface of the light guide plate. The light enters the light guide plate from the side surface and then is guided to the light exit wall through the microstructures.

Accordingly, in the light-emitting device of the present disclosure, the light exit region of the light guide plate is at least partially engaged in the groove formed by the light exit wall and the side wall of the main body. In this way, in addition to fixing the light guide plate, the main body can also prevent water vapor from invading the inside of the light-emitting device, thereby preventing water droplets from being generated on the light exit wall and affecting the illumination effect. The light guide plate with a uniform thickness of the present disclosure can reduce the thickness to be thinner than the existing light bars that need to be formed by molding, so the light-emitting device of the present disclosure has advantages in cost, weight, and space. By designing the light exit wall of the main body into a ring shape and designing the light guide plate to be curved, the light leaving through the light exit wall from the light exit region of the light guide plate can make the light-emitting device present a special light shape. In addition, by allowing the light to leave from the side surface of the light guide plate away from the light-emitting unit and exit through the side wall of the main body, the design flexibility of the light shape and the light-emitting area presented by the light-emitting device can be further increased.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
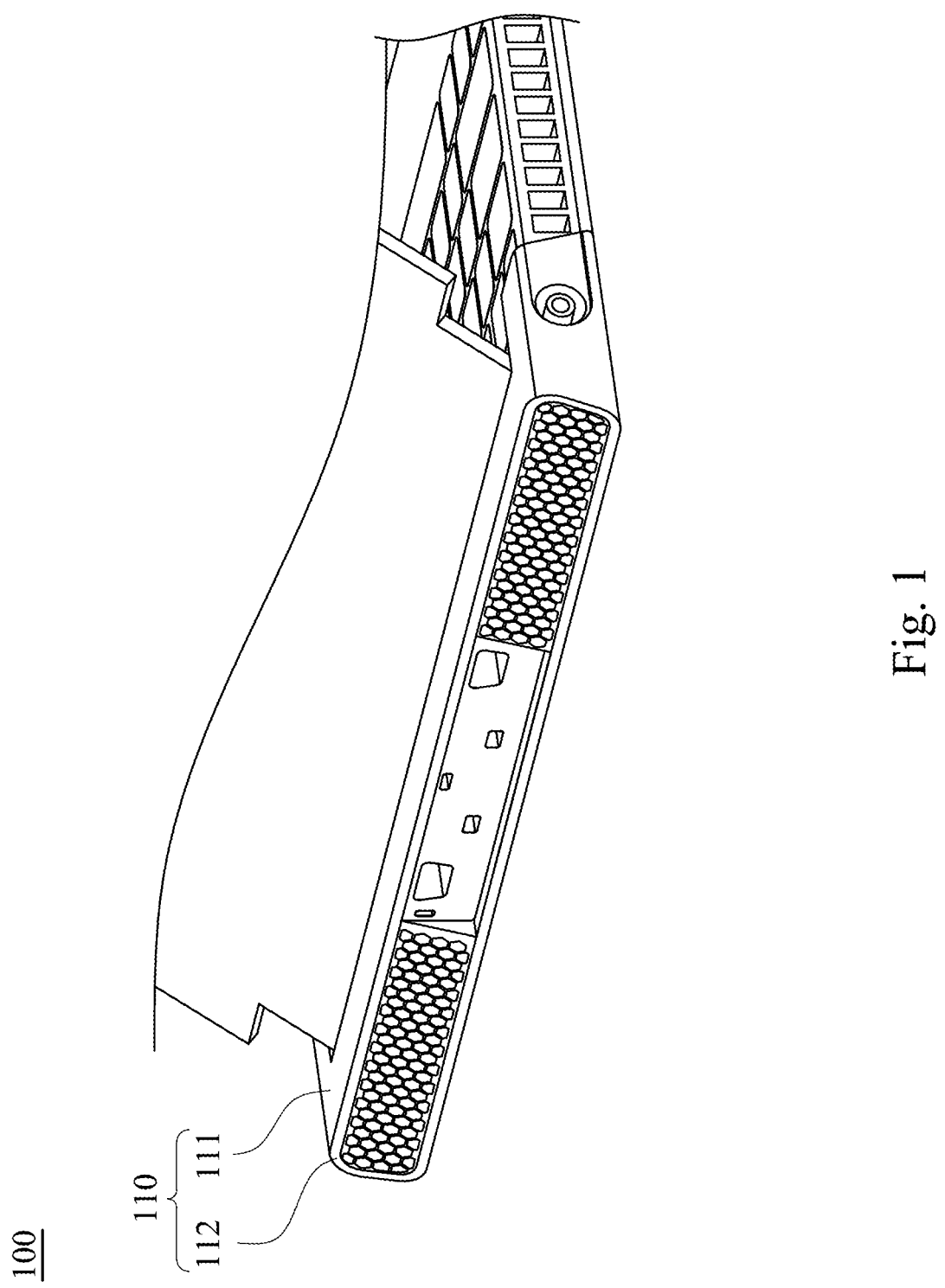
FIG. 1 is a partial perspective view of a light-emitting device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a partial perspective view of a light-emitting device 100 according to an embodiment of the disclosure. As shown in FIG. 1, in the present embodiment, the light-emitting device 100 includes a main body 110. The light-emitting device 100 in the present embodiment is a notebook computer as an example, and the main body 110 is, for example, at least a part of the housing of the host of the notebook computer, but the disclosure is not limited in this regard. In practical applications, the light-emitting device 100 can also be the other electronic product (e.g., a personal digital assistant, a gaming keyboard, etc.). That is, concepts of the light-emitting device 100 of the present disclosure may be applied to any electronic product. The structures and functions of some elements included in the light-emitting device 100 and the connections and operation relationships among these elements will be described in detail below.

Figure 2:
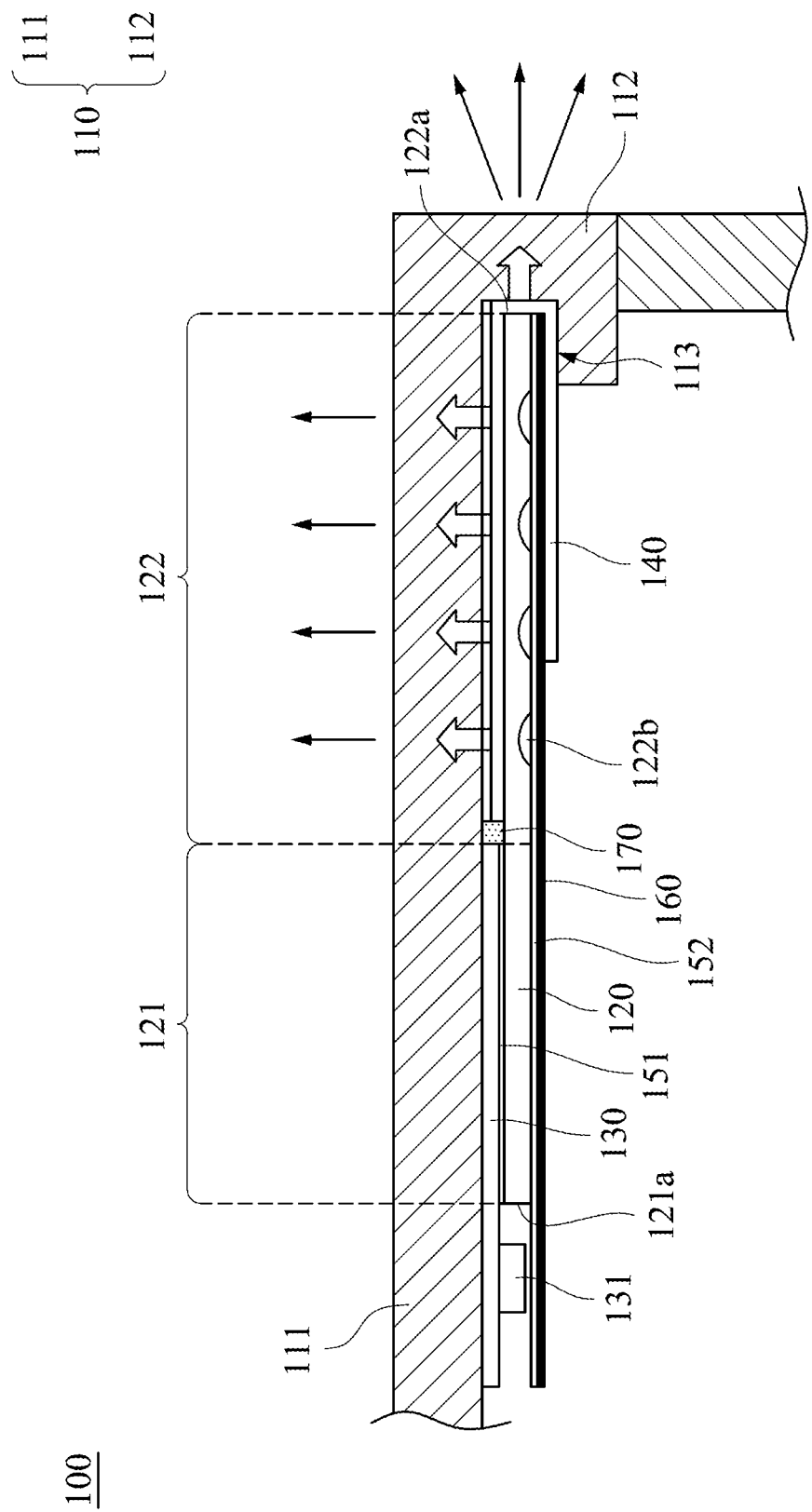
FIG. 2 is a partial cross-sectional view of the light-emitting device according to an embodiment of the disclosure.

Reference is made to FIG. 2. FIG. 2 is a partial cross-sectional view of the light-emitting device 100 according to an embodiment of the disclosure. As shown in FIG. 2, in the present embodiment, the light-emitting device 100 further includes a light guide plate 120 and a flexible circuit board 130. The main body 110 of the light-emitting device 100 includes a light exit wall 111 and a side wall 112 which are connected and bent relative to each other. The light exit wall 111 and the side wall 112 together form a groove 113. In detail, an end of the side wall 112 is connected to an edge of the light exit wall 111, and another end of the side wall 112 is bent and extends to be opposite to the light exit wall 111. For example, the cross-sectional profile of the side wall 112 in the viewing angle shown in FIG. 2 is L-shaped, while the cross-sectional profile of the groove 113 in the viewing angle shown in FIG. 2 is U-shaped, but the disclosure is not limited in this regard. The light guide plate 120 has a light exit region 122 and a light mixing region 121. The light exit region 122 and the light mixing region 121 are connected to each other. A plurality of microstructures 122b are disposed on the light exit region 122. At least a part of the light exit region 122 is engaged in the groove 113. The flexible circuit board 130 is disposed in the main body 110 and has a light-emitting unit 131. The light-emitting unit 131 is configured to emit light toward a side surface 121a of the light mixing region 121. The light enters the light guide plate 120 from the side surface 121a of the light mixing region 121 and is totally reflected in the light mixing region 121, and then is guided to the light exit wall 111 through the microstructures 122b. In some embodiments, the microstructures 122b may be uniformly distributed, arranged from sparse to dense, or arranged from dense to sparse, so as to produce a uniform or gradient illumination effect. For example, the microstructures 122b may be arranged from sparse to dense along a direction, so that a brightness of the light passing through the light exit wall 111 increases along the direction. The direction is, for example, from a side close to the light mixing region 121 to a side away from the light mixing region 121, but the disclosure is not limited in this regard.

With the foregoing structural configurations, in addition to fixing the light guide plate 120, the side wall 112 which is L-shaped of the main body 110 can also prevent water vapor from invading the inside of the light-emitting device 100, thereby preventing water droplets from being generated on the light exit wall 111 and affecting the illumination effect.

In some embodiments, the main body 110 may be made of translucent plastic. Therefore, when the light-emitting unit 131 is not emitting light, the user can see the main body 110 that is opaque (e.g., black) as a whole without seeing the components inside the main body 110; and when the light-emitting unit 131 is emitting light, the user can see the illumination effect presented by the light exit wall 111 of the main body 110. For example, the plastics include polycarbonate (PC), but the disclosure is not limited in this regard.

In addition, as shown in FIG. 2, the light guide plate 120 of the present embodiment has a uniform thickness and can be thinned (e.g., to about 0.2 mm) to be thinner than the existing light bars that need to be formed by molding, so the light-emitting device 100 of the present embodiment has advantages in cost, weight, and space.

As shown in FIG. 1, in the present embodiment, the light exit wall 111 of the main body 110 has a ring shape. By designing the light exit wall 111 into the ring shape and flexing the light guide plate 120 to be curved (because it is thin enough and flexible) according to the shape of the light exit wall 111, the light leaving through the light exit wall 111 from the light exit region 122 of the light guide plate 120 can make the light-emitting device 100 present a special light shape. Since the light guide plate 120 can be directly flexed into a corresponding shape to match with the main body 110, it has higher application flexibility compared to the light bars that need to be formed by molding.

As shown in FIGS. 1 and 2, in the present embodiment, the side wall 112 of the main body 110 is connected to an edge of the light exit wall 111 and extends to an inner side of the light exit wall 111. A bottom of the groove 113 is at least partially transparent (the bottom of the groove 113 mentioned here refers to the other end relative to the opening of the groove 113). Part of the light leaves the light guide plate 120 from a side surface 122a of the light guide plate 120 away from the light-emitting unit 131 and leaves the main body 110 through the bottom of the groove 113. By allowing the light to leave from the side surface 122a of the light guide plate 120 away from the light-emitting unit 131 and exit through the side wall 112 of the main body 110, the design flexibility of the light shape and the light-emitting area presented by the light-emitting device 100 can be further increased. That is, in addition to the light exit wall 111 of the main body 110 can present the illumination effect, the side wall 112 of the present embodiment can also present an illumination effect at the same time.

As shown in FIG. 2, in the present embodiment, the light-emitting device 100 further includes a light mixing film 140. The light mixing film 140 covers at least a part of the light guide plate 120. The light mixing film 140 is partially adhered to the flexible circuit board 130 (e.g., through an adhesive member 170) and wraps the light guide plate 120 in a surrounding manner. Specifically, the light mixing film 140 is disposed between the light exit region 122 of the light guide plate 120 and the light exit wall 111 of the main body 110, extends into the groove 113, and covers the side surface 122a of the light guide plate 120. In this way, the light after leaving the light guide plate 120 can be further mixed or diffused before reaching the light exit wall 111 and the side wall 112 of the main body 110, so that the light passing through the light mixing film 140 can be softer. In some embodiments, the light mixing film 140 may be omitted.

In the present embodiment, adhesive may not be provided on the path of the light propagated from the light guide plate 120 to the main body 110 to prevent the adhesive from affecting the illumination effect. For example, the light mixing film 140 may not be fixed to the light exit wall 111 and the side wall 112 of the main body 110 by the adhesive (that is, there may be an air layer therebetween), and the light exit region 122 and the side surface 122a of the light guide plate 120 may not be directly attached and fixed to the light mixing film 140 (the light mixing film 140 may be fixed by adhering to the flexible circuit board 130 and the light-shielding film 160 under the light guide plate 120). In the embodiment without the light mixing film 140, the light exit region 122 of the light guide plate 120 and the light exit wall 111 of the main body 110 may not be fixed by the adhesive (that is, an air layer may exist therebetween), and the side surface 122a of the light guide plate 120 and the side wall 112 of the main body 110 may not be fixed by the adhesive (that is, an air layer may exist therebetween), so as to prevent the adhesive from affecting the illumination effect.

As shown in FIG. 2, in the present embodiment, the light-emitting device 100 further includes reflective layers 151, 152. The reflective layer 151 is disposed on a surface of the flexible circuit board 130 facing the light guide plate 120. The reflective layer 152 is located under the light guide plate 120. In this way, the light emitted by the light-emitting unit 131 and entering from the side surface 121a of the light mixing region 121 can be restricted to be uniformly reflected in the light mixing region 121, thereby increasing the uniformity of the light. In some embodiments, the light mixing region 121 may be defined as an orthographic projection region of the reflective layer 151 on the light guide plate 120, and the light exit region 122 may be defined as the region other than the orthographic projection region of the reflective layer 151 on the light guide plate 120, but the present disclosure is not limited in this regard.

As shown in FIG. 2, in the present embodiment, a light-shielding film 160 is disposed on a bottom surface of the reflective layer 152. For example, the light-shielding film 160 may be a black ink layer formed on the bottom surface of the reflective layer 152 through a printing process, so as to prevent the light from leaking from the bottom of the light guide plate 120 through the reflective layer 152, but the present disclosure is not limited in this regard. In addition, in some embodiments, a white ink layer may be formed on the top surface of the reflective layer 152 through a printing process to increase the utilization of light, but the present disclosure is not limited in this regard.

Figure 3:
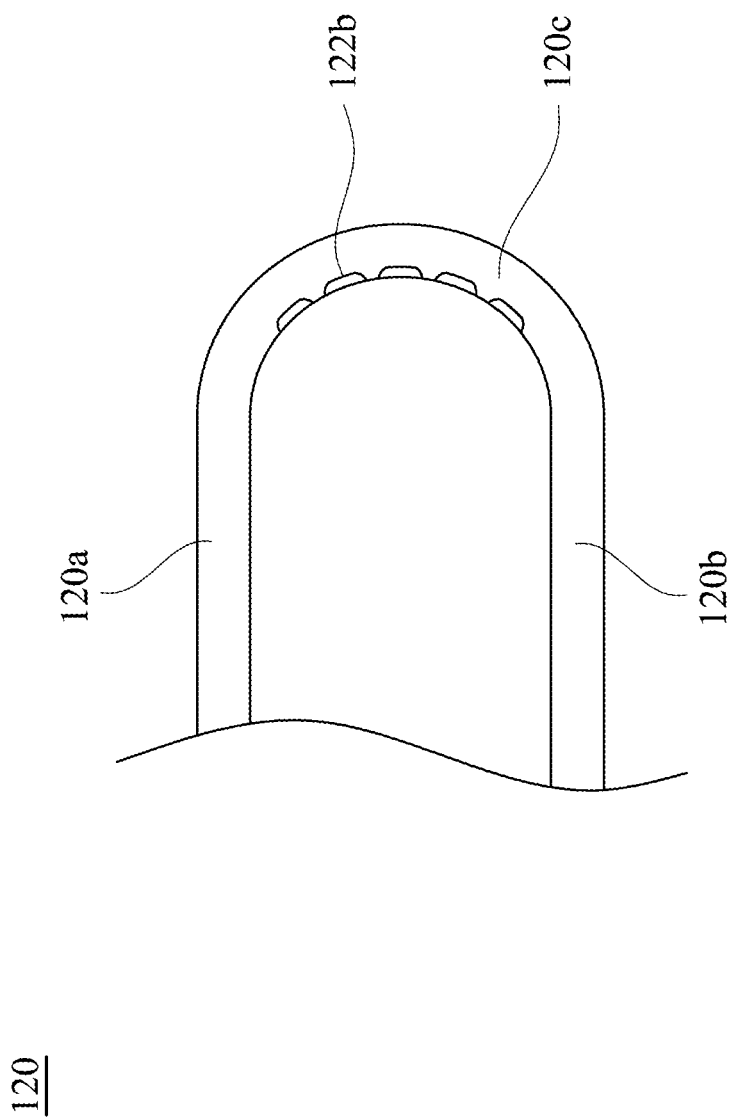
FIG. 3 is a partial cross-sectional view of a light guide plate according to an embodiment of the disclosure.

Reference is made to FIG. 3. FIG. 3 is a partial cross-sectional view of the light guide plate 120 according to an embodiment of the disclosure. The viewing angle shown in FIG. 3 is the viewing angle viewed from the side of the light guide plate 120 away from the light-emitting unit 131. As shown in FIG. 3, in the present embodiment, the light guide plate 120 includes a first plate portion 120a, a second plate portion 120b, and a bent portion 120c. The second plate portion 120b is opposite to the first plate portion 120a. The bent portion 120c is connected to edges of the first plate portion 120a and the second plate portion 120b at an identical side thereof. In the embodiment in which the light exit wall 111 of the main body 110 has the ring shape, the first plate portion 120a, the second plate portion 120b, and the bent portion 120c face different parts of the inner surface of the light exit wall 111 respectively. It should be noted that, at least parts of the microstructure 122b are located on the bent portion 120c. When actually manufacturing the light guide plate 120, the microstructure 122b may be formed on one side of the light guide plate 120 first, and then the light guide plate 120 is bent into the shape as shown in FIG. 3. In contrast, the existing molding technology cannot be used to produce a light bar with a thickness of less than 1 mm and the appearance of the light guide plate 120 shown in FIG. 3, nor form the microstructures 122b on the bent portion 120c of the light guide plate 120 as the present embodiment. Since the bent portion 120c of the light guide plate 120 may have the microstructures 122b, the light exit wall 111 can also have a good illumination effect at the curved portions thereof on both sides.

Figure 4:
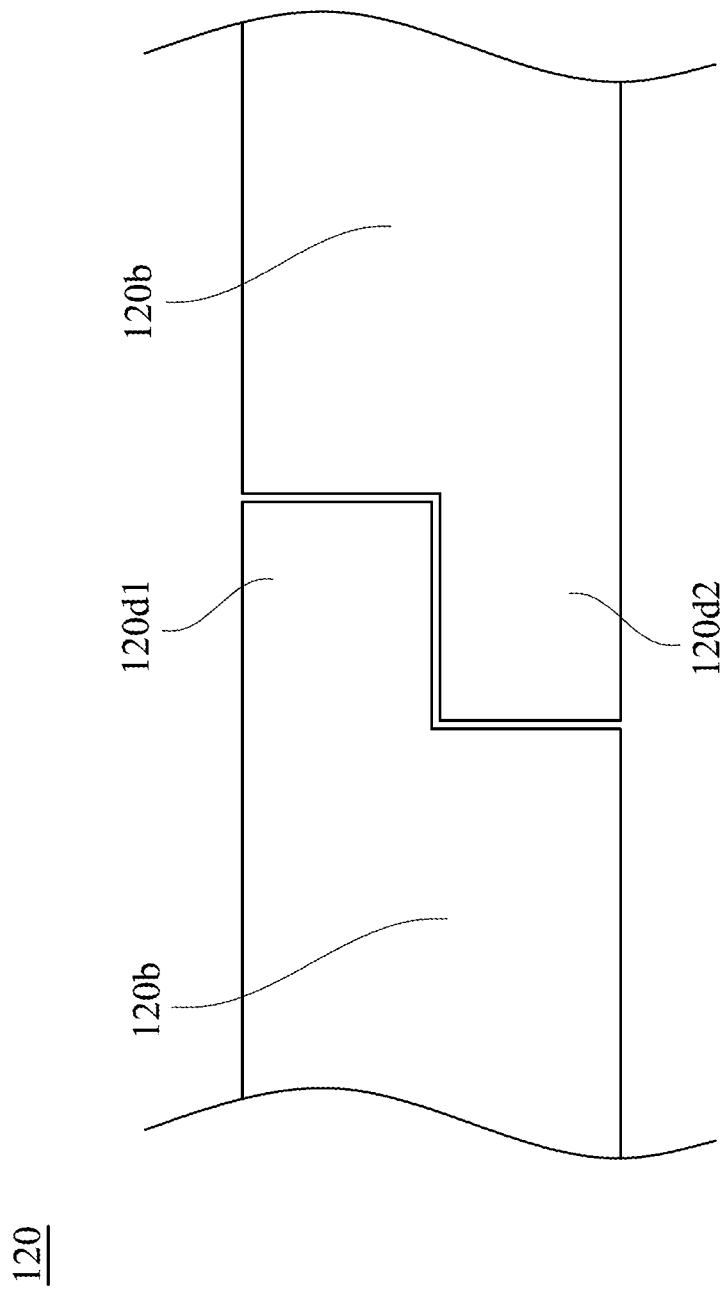
FIG. 4 is a partial cross-sectional view of the light guide plate according to an embodiment of the disclosure.

Reference is made to FIG. 4. FIG. 4 is a partial cross-sectional view of the light guide plate 120 according to an embodiment of the disclosure. The viewing angle shown in FIG. 4 is the viewing angle viewed from the side of the light guide plate 120 away from the light-emitting unit 131. As shown in FIG. 4 with reference to FIG. 3, in the present embodiment, the first plate portion 120a is connected between two second plate portions 120b respectively via two bent portions 120c. The first plate portion 120a is located at the upper part of the light guide plate 120, the two bent portions 120c are respectively located at the two side parts of the light guide plate 120, and the two second plate portions 120b are located at the lower part of the light guide plate 120. Both ends of the light guide plate 120 are spliced at the second plate portions 120b located at the lower part. With the foregoing structural configurations, the light guide plate 120 is ring-shaped. In order to effectively eliminate discontinuous dark lines at the slicing portion of the light guide plate 120, the light guide plate 120 further includes extending portions 120d1, 120d2 respectively connected to distal ends of the two second plate portions 120b. The extending portions 120d1, 120d2 are stacked on each other, and the overall thickness of the light guide plate 120 can still be substantially uniform with the stacking. In this way, when viewing the splicing portion of the second plate portions 120b from below, since there is still a continuous and light guide portion behind the slicing seam of the light guide plate 120, the aforementioned problem of dark lines can be effectively eliminated. In other embodiments, both ends of the light guide plate 120 may also be spliced at other parts, such as the first plate portion 120a or the bent portion 120c, which will not be repeated here.

According to the foregoing recitations of the embodiments of the disclosure, it can be seen that in the light-emitting device of the present disclosure, the light exit region of the light guide plate is at least partially engaged in the groove formed by the light exit wall and the side wall of the main body. In this way, in addition to fixing the light guide plate, the main body can also prevent water vapor from invading the inside of the light-emitting device, thereby preventing water droplets from being generated on the light exit wall and affecting the illumination effect. The light guide plate with a uniform thickness of the present disclosure can reduce the thickness to be thinner than the existing light bars that need to be formed by molding, so the light-emitting device of the present disclosure has advantages in cost, weight, and space. By designing the light exit wall of the main body into a ring shape and designing the light guide plate to be curved, the light leaving through the light exit wall from the light exit region of the light guide plate can make the light-emitting device present a special light shape. In addition, by allowing the light to leave from the side surface of the light guide plate away from the light-emitting unit and exit through the side wall of the main body, the design flexibility of the light shape and the light-emitting area presented by the light-emitting device can be further increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A light-emitting device, comprising:
    a main body comprising a light exit wall and a side wall which are connected and bent relative to each other, wherein the light exit wall and the side wall together form a groove;
    a light guide plate having a light exit region and a light mixing region, a plurality of microstructures being disposed on the light exit region, wherein at least a part of the light exit region is engaged in the groove; and
    a flexible circuit board having a light-emitting unit, the light-emitting unit being configured to emit a light toward a side surface of the light mixing region, wherein the light enters the light guide plate from the side surface of the light mixing region and is totally reflected in the light mixing region, and then is guided to the light exit wall through the microstructures,
    wherein a bottom of the groove is at least partially transparent, and part of the light leaves the light guide plate from a side surface of the light guide plate and leaves the main body through the bottom of the groove.

2. The light-emitting device of claim 1, further comprising a light mixing film covering at least a part of the light guide plate.

3. The light-emitting device of claim 2, wherein the light mixing film is partially adhered to the flexible circuit board and wraps the light guide plate in a surrounding manner.

4. The light-emitting device of claim 1, further comprising a reflective layer disposed on a surface of the flexible circuit board facing the light guide plate.

5. The light-emitting device of claim 1, wherein the light exit wall has a ring shape.

6. The light-emitting device of claim 5, wherein the side wall is connected to an edge of the light exit wall and extends to an inner side of the light exit wall.

7. The light-emitting device of claim 1, further comprising a light mixing film, wherein the light mixing film is disposed between the light exit region and the light exit wall, extends into the groove, and covers the side surface of the light guide plate.

8. The light-emitting device of claim 1, further comprising a reflective layer, wherein the reflective layer is located under the light guide plate, and a light-shielding film is disposed on a bottom surface of the reflective layer.

9. The light-emitting device of claim 1, wherein the light guide plate is curved and has a uniform thickness.

10. The light-emitting device of claim 9, wherein the light guide plate comprises:
    a first plate portion;
    at least one second plate portion opposite to the first plate portion; and
    at least one bent portion connected to edges of the first plate portion and the at least one second plate portion at an identical side thereof, wherein at least parts of the microstructures are located on the at least one bent portion.

11. The light-emitting device of claim 10, wherein a number of the at least one second plate portion and a number of the at least one bent portion are two, the first plate portion is connected between the second plate portions respectively via the bent portions, each of the second plate portions has an extending portion at an end thereof, and the extending portions of the second plate portions are stacked on each other.

12. The light-emitting device of claim 1, wherein the microstructures are arranged from sparse to dense along a direction, so that a brightness of the light passing through the light exit wall increases along the direction.

13. The light-emitting device of claim 1, wherein an end of the side wall is connected to an edge of the light exit wall, and another end of the side wall is bent and extends to be opposite to the light exit wall.

14. A light-emitting device, comprising:
    a main body comprising a light exit wall and a side wall which are connected and bent relative to each other, wherein the light exit wall and the side wall together form a groove;

a light guide plate having a light exit region which is curved, a plurality of microstructures being disposed on the light exit region, wherein at least a part of the light exit region is engaged in the groove; and a flexible circuit board having a light-emitting unit, the light-emitting unit being configured to emit a light toward a side surface of the light guide plate, wherein the light enters the light guide plate from the side surface and then is guided to the light exit wall through the microstructures, wherein a bottom of the groove is at least partially transparent, and part of the light leaves the light guide plate from a side surface of the light guide plate and leaves the main body through the bottom of the groove.

* * * * *